(12) United States Patent
Featherly et al.

(10) Patent No.: US 10,050,509 B2
(45) Date of Patent: Aug. 14, 2018

(54) ELECTRICAL POWER GENERATION AND DISTRIBUTION

(71) Applicant: Energy Producing Systems of America LLC, Holiday, FL (US)

(72) Inventors: Robert J. Featherly, New Port Richey, FL (US); Rudolph M. Toncich, Holiday, FL (US)

(73) Assignee: ENERGY PRODUCING SYSTEMS OF AMERICA LLC, Holiday, FL (US)

( * ) Notice: Subject to any disclaimer, the term of this patent is extended or adjusted under 35 U.S.C. 154(b) by 0 days.

(21) Appl. No.: 15/400,662

(22) Filed: Jan. 6, 2017

(65) Prior Publication Data
US 2018/0198360 A1    Jul. 12, 2018

(51) Int. Cl.
*H02K 47/04* (2006.01)
*H02K 7/116* (2006.01)
*H02K 53/00* (2006.01)

(52) U.S. Cl.
CPC .............. *H02K 47/04* (2013.01); *H02K 7/116* (2013.01); *H02K 53/00* (2013.01); *Y10S 74/09* (2013.01)

(58) Field of Classification Search
CPC ........ H02J 7/00; B60L 11/1851; H02K 47/04; H02K 7/116; H02K 53/00; Y10S 74/09
See application file for complete search history.

(56) References Cited

U.S. PATENT DOCUMENTS

| | | | |
|---|---|---|---|
| 8,509,973 B2* | 8/2013 | Goodwin | B60L 3/0046 310/45 |
| 9,263,968 B2* | 2/2016 | Potts | H02M 3/33584 |
| 2009/0177595 A1* | 7/2009 | Dunlap | B60L 11/1824 705/412 |
| 2011/0084665 A1* | 4/2011 | White | B60L 11/1822 320/134 |
| 2013/0154363 A1* | 6/2013 | Lim | H02K 53/00 307/10.1 |
| 2017/0168516 A1* | 6/2017 | King | G05F 1/66 |

* cited by examiner

*Primary Examiner* — Emily P Pham
(74) *Attorney, Agent, or Firm* — Quarles & Brady LLP

(57) ABSTRACT

Systems and methods of generating, storing and/or distributing electric power are disclosed. The system may include two or more direct current battery subsystems, a direct current motor/alternating current generator combination, an electric power distribution network, and battery recharging elements. One battery subsystem may power an alternating current generator while the other battery subsystem charges using a portion of the generated power. Excess power may service other electric loads. The roles of the battery subsystems may be switched periodically between charging and powering, repeatedly. A gear box may connect the electric motor and generator to adjust the relative rotational speeds of each for optimal performance of the system.

20 Claims, 3 Drawing Sheets

ELECTRICAL POWER GENERATION AND DISTRIBUTION

CROSS REFERENCE TO RELATED APPLICATIONS

N/A

FIELD OF THE INVENTION

The present invention relates generally to systems and methods of generating, storing and/or providing electrical energy.

BACKGROUND OF THE INVENTION

The consumption of electrical power worldwide is vast and will likely continue to grow as traditionally non-electrical powered machines are replaced with electrically powered counterparts. For example, electrically powered vehicles, and in particular passenger automobiles, are becoming more and more prevalent on nations' road systems. One popular electric automobile manufacturer in the United States with annual sales of roughly fifty thousand units in 2015-16 has announced its intention to grow the number of sales to five hundred thousand units within just a few years.

The impetus for switching to electrical power is multifaceted. The cost and environmental impact of generating electrical power is considered superior to that of alternative power sources, such as fossil fuel based power. This superiority is amplified by governmental and industry incentives to the consumer for utilizing electrical power in place of non-electrical power. For example, electric vehicle users have enjoyed tax breaks, preferred parking, preferred road access, and free recharging, all provided due to the use of electric power as opposed to fossil-fuel generated power for their transportation needs. Accordingly, there is a continued and growing need for systems to generate, store and distribute electrical power.

Developed countries all have sophisticated electrical power generation and distribution systems deployed nationwide sometimes referred to as the "power grid." While the grid is widely used and ubiquitous, it is not always available, and may not provide the lowest cost of power over a prolonged period. Although power outages are rare, occasional storms can disrupt the distribution of electric power to large segments of the population for prolonged periods. These power outages interfere with home life and work and can result in substantial lost productivity and comfort. Further, the cost of obtaining electric power from the grid can be significant, and there is little ability to inject much competition into the system to drive prices down. Accordingly, there is a need for both mobile and stationary electric power generation systems which are of a scale to power a single home, business, and vehicle, and which do not depend heavily on the grid for day-to-day operation.

Accordingly, it is an object of some, but not necessarily all embodiments of the present invention to provide systems and methods that generate electric power efficiently for home, business and vehicle use. It is also an object of some, but not necessarily all embodiments of the present invention to provide systems and methods that store and distribute electric power efficiently for home, business and vehicle use. These and other advantages of some, but not necessarily all embodiments of the present invention will be apparent to those of ordinary skill in the power generation, storage and distribution arts.

SUMMARY OF THE INVENTION

Responsive to the foregoing challenges, Applicant has developed an innovative electric power system comprising: a battery system; a switching subsystem coupled to the battery system; an alternating current power generation system connected to the switching subsystem; an electric power distribution system connected to the power generation system; and a battery charging system connected to the switching system.

Applicant has further developed an innovative electric power system comprising: first and second electric battery subsystems, each having a first pole with a first polarity and a second pole with a second polarity; a switching subsystem coupled to the first pole of the first electric battery subsystem and the first pole of the second electric battery subsystem; an electrically powered function control subsystem coupled to the switching subsystem and the second poles of the first and second electric battery subsystems, said function control subsystem including a processor and memory; a capacitor subsystem coupled to the function control subsystem; an electric motor coupled to the function control subsystem; an electric generator operatively connected to the electric motor; an electric power distribution subsystem coupled to the electric generator subsystem, said electric power distribution subsystem including an outlet load line adapted to be connected to an electric load; an inductor subsystem coupled to the electric power distribution system; and a rectifier subsystem coupled to the inductor subsystem, the switching subsystem, and the second poles of the first and second electric battery subsystems.

Applicant has still further developed an innovative method of generating, storing and distributing electric power comprising: applying direct current electric power from a first electric battery subsystem to a function control subsystem, wherein said function control subsystem is coupled to a capacitor subsystem; applying direct current electric power from the function control subsystem to a direct current motor; providing input rotational motion from the direct current motor to a gear box and generating output rotational motion from the gear box; generating alternate current electric power from the output rotational motion of the gear box; distributing a first portion of the generated alternate current electric power to an outlet load line adapted to be connected to an electric load, and a second portion of the generated alternate current electric power to an inductor subsystem; applying alternate current electric power from the inductor subsystem to a rectifier subsystem and generating direct current electric power using the rectifier subsystem; and applying direct current electric power from the rectifier subsystem to a second electric battery subsystem, wherein the relationship of the input rotational motion to the output rotational motion of the gear box is set to optimize power depletion of the first battery subsystem for a predetermined level of available power on the outlet load line and predetermined durations of the first, second and third operational phases.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1:
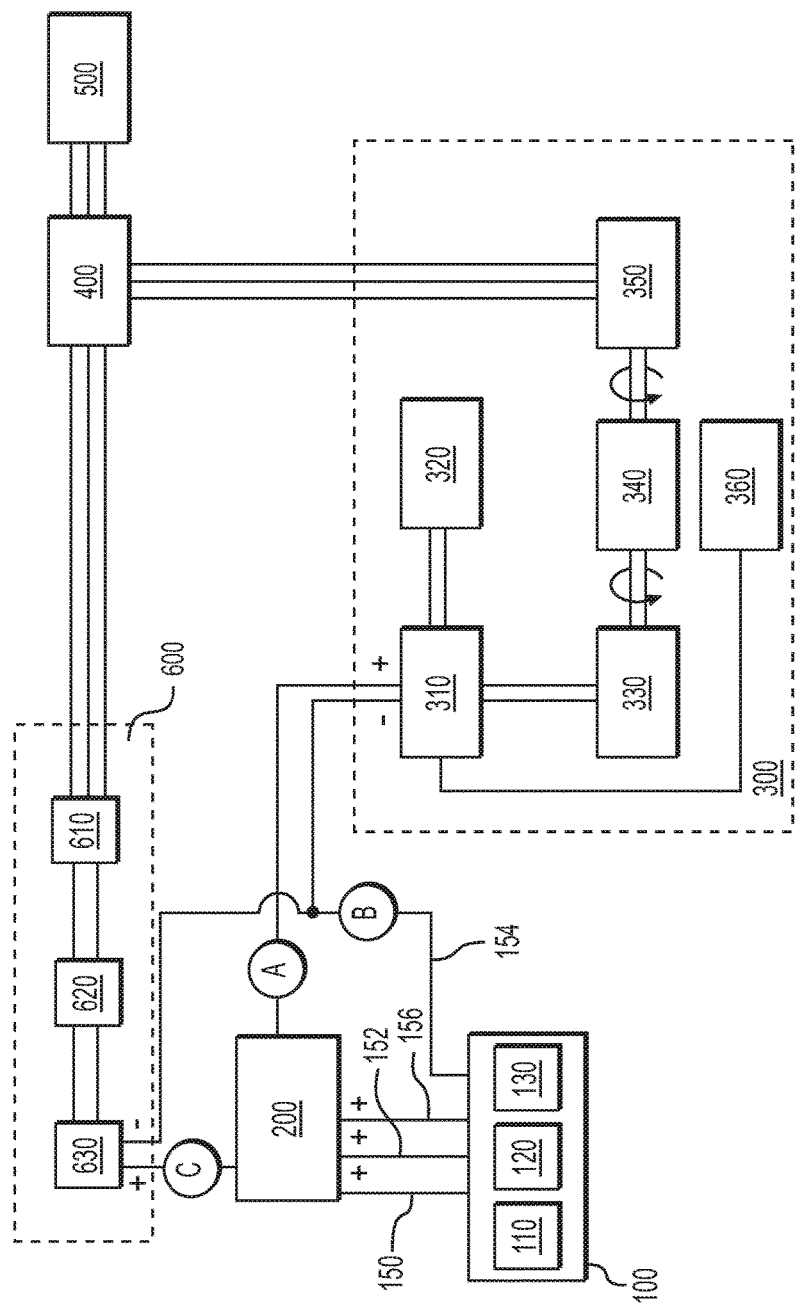
FIG. 1 is a schematic diagram of an electric power generation, distribution and storage system in accordance with a first embodiment of the present invention.

Reference will now be made in detail to embodiments of the present invention, examples of which are illustrated in the accompanying drawings. With reference to FIG. 1, in a first embodiment of the invention, a direct current (DC) battery system 100 may be electrically connected by a switching subsystem 200 to an alternating current (AC) electric power generation system 300. The power generation system 300 may be electrically connected to an AC power distribution subsystem 400, which in turn may be connected to a load source 500 and a battery charging system 600. The battery charging system 600 may be connected to the battery system 100 through the switching subsystem 200.

The DC battery system 100 may include first, second and third battery subsystems or banks 110, 120 and 130 that may each be comprised of a plurality of individual batteries and battery cells. The individual batteries and battery cells comprising each of the battery subsystems may be connected in series. In one non-limiting example, each battery subsystem may include a total of twelve lead-acid 12 volt, 200 amp, deep cycle batteries. Battery subsystems having these parameters may provide 5 kW constant output for a 15 minute period followed by 15 minutes of recharging (or rest) and 15 minutes of rest if just recharged (or recharging if just rested). It is appreciated that the type, voltage, amperage and other materials and qualities of the batteries used may vary without departing from the intended scope of the invention.

The batteries should have sufficient power and amperage when combined into battery subsystems to power the switching subsystem 200, power generation system 300, load source 500 and charging system 600 for a defined period of time without excessive discharge. In one embodiment, each battery subsystem 110, 120 and 130 may, at the start of battery life, power the overall system for fifteen (15) minute periods out of a forty-five (45) minute cycle without discharging more than about twenty percent (20%).

First positive poles of the first, second and third battery subsystems 110, 120 and 130 may be electrically connected to the switching subsystem 200 via conductors 150, 152 and 156, respectively. In turn, the switching subsystem 200 may be electrically connected via a positive polarity conductor through point A to the power generation system 300 and via a positive polarity conductor through point C to the charging system 600. The negative poles of the first, second and third battery subsystems 110, 120 and 130 may be electrically connected to the power generation system 300 and the charging system 600 via conductor 154 through point B.

Figure 2:
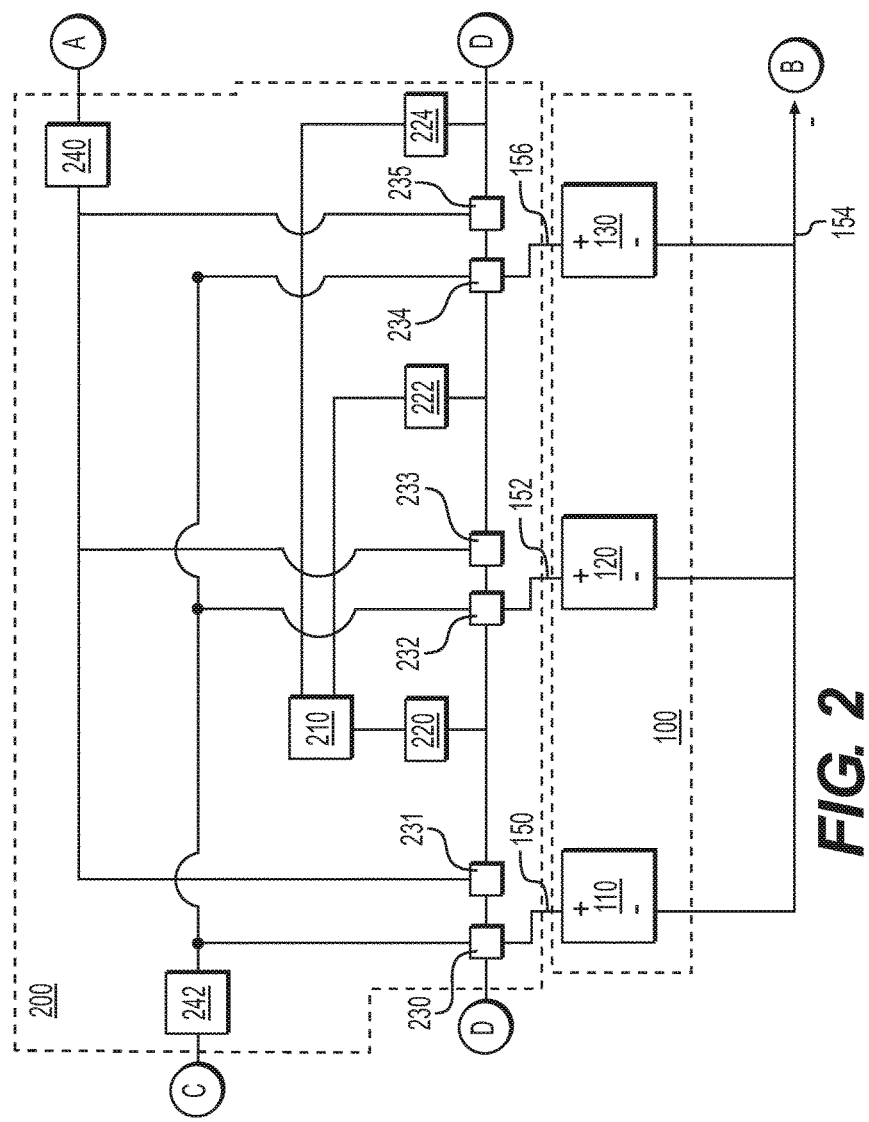
FIG. 2 is a detailed schematic diagram of the battery subsystem and switching subsystem of the system illustrated in FIG. 1.

One non-limiting embodiment of the switching subsystem 200 is illustrated in FIG. 2. With reference to FIG. 2, the switching subsystem 200 may include one or more timers 210 that may be electrically connected to first, second and third low voltage contactors 220, 222 and 224. The first low voltage contactor 220 may control first and second high voltage contactors 231 and 232; the second low voltage contactor 222 may control third and fourth high voltage contactors 233 and 234; and the third low voltage contactor 224 may control fifth and sixth high voltage contactors 235 and 230, connected together through point D in the circuit.

Under control of the timers 210 and the first and third low voltage contactors 220 and 224, the first and sixth high voltage contactors 231 and 230 may selectively connect the first battery subsystem 110 to a first bus 240, a second bus 242, or to neither bus. The timers 210 and the first and second low voltage contactors 220 and 222 may control the second and third high voltage contactors 232 and 233 to selectively connect the second battery subsystem 120 to the first bus 240, the second bus 242, or to neither bus. Similarly, the timers 210 and the second and third low voltage contactors 222 and 224 may control the fourth and fifth high voltage contactors 234 and 235 to selectively connect the third battery subsystem 130 to the first bus 240, the second bus 242, or to neither bus.

The timers 210 may send low voltage control signals to the first, second and third low voltage contactors 220, 222 and 224 automatically and/or under the control of a function control subsystem, discussed below. Such signals may activate a particular low voltage contactor and cause it to open or close the high voltage contactors connected to it. As a result, the combination of the timers 210, low voltage contactors 220, 222 and 224, and high voltage contactors 230, 231, 232, 234, 235 and 236 may selectively connect each of the battery subsystems 110, 120 and 130 to the first bus 240, the second bus 242 or to neither bus. The cascade arrangement of the timers 210, low voltage contactors 220-224 and high voltage contactors 230-235 permits only one of the battery subsystems to be connected to the first bus 240 and only one other of the battery subsystems to be connected to the second bus 242, at a time. It is appreciated, however that the system may tolerate the possibility of a short duration of overlap time during which two battery subsystems may be connected to the same bus at the same time.

With reference to FIGS. 1 and 2, the first bus 240 may be connected through point A to the power generation system 300, and the second bus 242 may be connected through point C to the charging system 600. Thus, functionally the switching subsystem 200 may be adapted to selectively switch between:

(i) connecting the first pole of the first battery subsystem 110 to the charging system 600 while at the same time connecting the first pole of the second battery subsystem 120 to the power generation system 300 during a first operational phase, (ii) connecting the first pole of the second battery subsystem 120 to the charging system 600 while at the same time connecting the first pole of the third battery subsystem 130 to the power generation system 300 during a second operational phase, and (iii) connecting the first pole of the third battery subsystem 130 to the charging system 600 while at the same time connecting the first pole of the first battery subsystem 110 to the power generation system 300 during a third operational phase.

Figure 3:
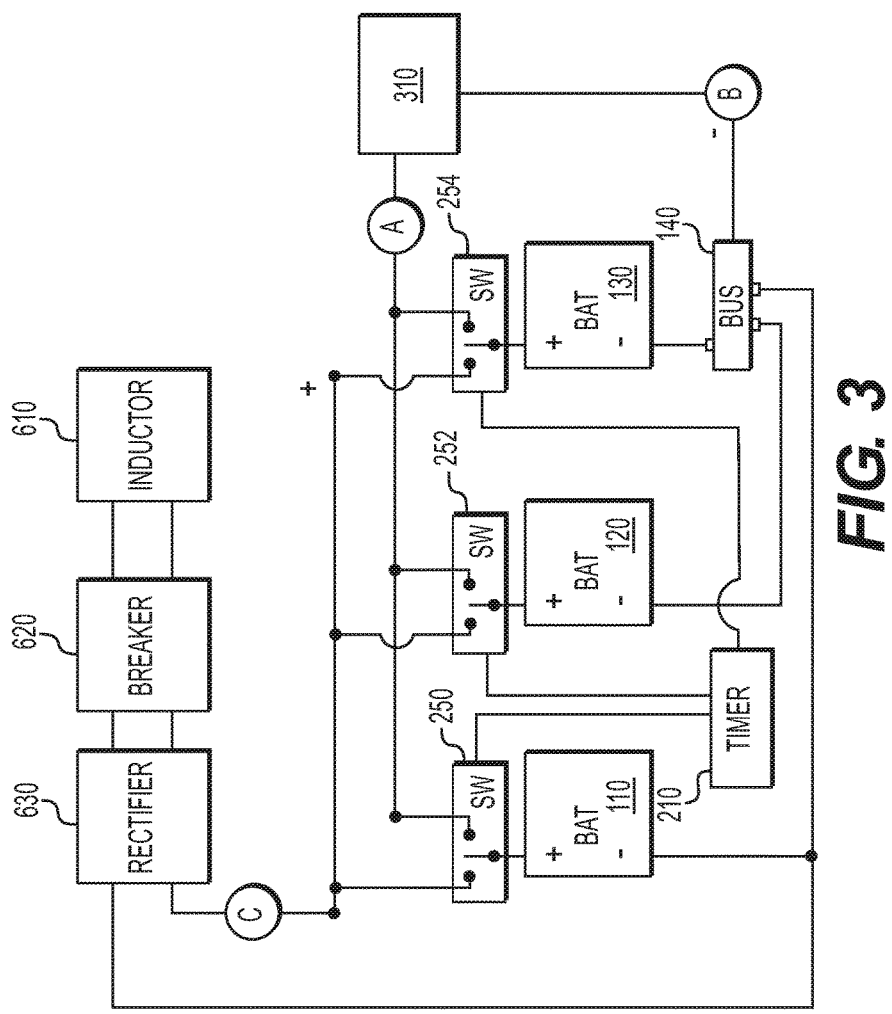
FIG. 3 is a detailed schematic diagram of an alternative switching subsystem for the system illustrated in FIG. 1.

An alternative embodiment of the switching subsystem 200 is illustrated by the FIG. 3 schematic diagram. With regard to FIGS. 1 and 3, three-way switches 250, 252 and 254 may each connect the positive pole of an associated battery subsystem (110, 120 and 130) to one of: point A or point C in the overall circuit, or a circuit disconnect position (as shown). The three-way switches 250, 252, and 254 may be controlled by one or more timers 210 to provide switching similar to that provided by the FIG. 2 embodiment.

With renewed reference to FIG. 1, the power generation system 300 may include a function control subsystem 310 electrically connected to and powered by the battery system 100 through the switching subsystem 200. The function control subsystem 310 may optionally be connected to and control the timers 210 in the switching subsystem 200. The function control subsystem 310 may provide power from one of the battery subsystems in the battery system 100 at a time to drive a DC electric motor 330, which in turn may drive an AC electric generator 350. An adjustable input/output ratio gear box 340 may operationally connect the electric motor 330 to the electric generator 350. The function control subsystem 310 may control the speed of the electric motor subsystem 330 and the gear box input/output rotational speed ratio.

The power generation system 300 may also include a cooling subsystem 360 controlled by the function control subsystem 310. The cooling subsystem 360 may be in operational contact with any and/or all heat generating components of the overall system, such as the function control subsystem 310, the electric motor 330, the gear box 340 and the electric generator 350. The cooling subsystem 360 may maintain system elements in optimal operating temperature ranges in a manner known to those of skill in the art.

A capacitor subsystem 320 may be electrically coupled to the function control subsystem 310. The capacitor subsystem 320 may include a plurality of capacitors interconnected in parallel with one another. The capacitor subsystem 320 may be used to control and correct system characteristics such as power factor lag and phase shift. The capacitor subsystem 320 may also increase stored energy and improve stabilization of the sine wave generated by the processor in the function control subsystem 310.

The function control subsystem 310 may include a digital processor, digital memory components, and control programming as needed to operate the overall system in the manner described herein. For example, the function control subsystem 310 may include programming that controls system components for a start up sequence, a shut down sequence, vibration monitoring, over heat monitoring, and remote monitoring. The function control subsystem 310 may also include or be connected to one or more parameter monitoring components that provide system data. Such data may include, but not limited to: battery charge level and capacity, battery amperage, battery voltage, battery usage time, battery charge time, current time, system element temperatures, vibration, source load, electric motor torque, electric motor rpm, gear box ratio, electric generator torque, electric generator rpm, charging system load, rectifier settings and inductor settings.

The size and operational characteristics of the electric motor 330, electric generator 350 and gear box 340 may be selected to provide optimal power generation and battery life for a given expected load 500 to be serviced by the system, as well as recharge rate and time for the battery subsystems 110, 120 and 130. For battery subsystems of the type described, the electric motor 330 may require 144V/100 A to maintain operation. The speed of the electric motor 330 is preferably set at or near the minimum rpm needed to drive the electric generator 350 using the gear box 340 to provide the required amperage and voltage to service the load 500 and recharge one battery subsystem while at the same time reducing or minimizing torque imposed by the electric generator 350. The use of the gear box 340 may provide increased torque at the electric generator 350 without increasing (and preferably decreasing) the torque requirements of the electric motor 330, thereby lowering the power drain on the battery subsystem driving the electric motor and improving battery depletion characteristics for a given power output of the generator.

The speed of the electric motor 330 and the gear box 340 ratio may be automatically set on a real-time, moment-to-moment basis by the function control subsystem 310. The function control subsystem 310 may receive electric motor 330 speed data from a speed sensor, located for example on the shaft of the motor, as well as battery recharging and load 500 power requirements from other sensors. The function control subsystem 310 may adjust the electric motor 330 speed and gear box 340 setting so that the electric generator 350 provides the required power at that point in time at maximum torque to the generator and minimum torque on the motor. In this manner, the function control subsystem 310 may optimize power generation conditions (gear box ratio, electric motor rpm speed and electric generator rpm speed) on a real-time basis.

The electric generator 350 may be connected via one or more electrical conductors to the AC power distribution subsystem 400. The power distribution subsystem may comprise an AC breaker box, for example. The power distribution subsystem 400 may be connected via one or more conductors to the load source 500 and the charging system 600. The power needs of the load source 500 and the charging system 600 may be communicated to the function control subsystem 310 via wired or wireless communication channels from sensors associated with the power distribution subsystem 400, load source 500 and/or charging system 600. The power needs may be used by an automatic throttle control module of the function control subsystem 310 to set the electric motor 330 to run at the correct rpm's and the gear box 340 at the correct gear ratio for the power needs of the system.

The charging system 600 may include an inductor subsystem 610, electrically connected via one or more circuit breakers 620 to a rectifier subsystem 630. The combination of the inductor subsystem 610 and the rectifier subsystem 630 are used to provide the required level of recharge to one of the idle battery subsystems 110, 120 or 130 over the desired recharge cycle, which, in the case of a system using three battery subsystems is one-third of the overall system cycle time. The rectifier subsystem 630 may be self-adjusting to accommodate the recharge draw of the battery subsystem currently charging. In other words, normally in the absence of the inductor subsystem 610, the self-adjusting rectifier subsystem 630 may reduce the voltage and/or amperage supplied to the battery subsystem undergoing recharge over the course of the charging cycle. As a result, without inclusion of the inductor subsystem 310, the battery subsystems may not recharge quickly enough to fully recharge in the desired cycle time. The addition of the inductor subsystem 610 with an adjustable rheostat may permit increasing the amperage draw of the charging system 600 (and thus the amperage available to recharge the idle battery subsystem) as compared with a system without an induction coil. Preferably, the rheostat setting of the inductor subsystem 610 may be automatically adjusted over the course of the recharging cycle under the control of the function control 316. The rheostat setting preferably should be adjusted in real time so that full or nearly full recharging is completed over the desired amount of time using the least amount of total power drain on the battery subsystem used to power the system during that time.

The systems illustrated in FIGS. 1-3 may be used to generate, store and distribute electricity to power a load source 500 while at the same generating electrical power to recharge deplete battery subsystems 110, 120 and/or 130 in the following manner. The method of using the illustrated systems may be initiated by the function control subsystem 310 transmitting a wired or wireless control signals to the switching subsystem 200 during a first operational stage. The function control subsystem 310 signals may cause the timer 210 to send low voltage control signals to the first, second and third low voltage contactors 220, 222 and 224. The timer 210 control signals may direct the first and third low voltage contactors 220 and 224 to couple the first positive pole of the first battery subsystem 110 to the first bus 240 through the conductor 150 and high voltage contactors 230 and/or 231. In turn, the first bus 240 connects the first battery subsystem 110 to the function control 310 and the electric motor 330. Because the second negative pole of the first battery subsystem 110 is permanently coupled to the function control 310 and the electric motor 330, a circuit is temporarily completed to power the electric motor using the first battery subsystem.

At the same time that the first battery subsystem is used to power the electric motor 330 (i.e., the first operational phase), control signals sent from the function control 310 to the timer 210 may be used to control the first, second and third low voltage contactors 220, 222 and 224 to make other battery subsystem connections and disconnections. Specifically, the low voltage contactors 220, 222, and 224 may be used to control the high voltage contactors 232, 233, 234 and 235 to temporarily connect the first positive pole of the second battery subsystem 120 to the second bus 242 and to temporarily isolate the first positive pole of the third battery subsystem 130 from any circuit. As a result, the second battery subsystem 120 may be connected to the rectifier subsystem 630 and the third battery subsystem 130 may be isolated during the first operational phase.

During the first operational phase, the electric motor 330 spins under the power of the first battery subsystem 110. The rotational motion of the electric motor 330 is used to drive the electric generator 350 through the gear box 340. The torque resistance of the electric generator 350 on the electric motor may vary depending upon the load applied to the generator from the load source 500 and the charging system 600, and the gear ratio of the gear box 340. The gear ratio of the gear box 340 may be selectively adjusted by the function control 310 to optimize the torque and speed of the electric motor 330 for the load applied to the electric generator 350. Preferably, torque is minimized for a given range of preferred electric motor speed using the gear box 340. A torque sensor may provide feedback to the function control 310; which may adjust the gear ratio of the gear box 340 in real time to optimize electric motor 330 speed.

The electric power output of the electric generator 350 is directed in part by the distribution subsystem 400 to the charging system 600. The inductor subsystem 610 and the rectifier subsystem 630 of the recharging system 600 work together, preferably under the control of the function control 310, to recharge the second battery subsystem 120 during the first operational phase. The first operational phase may be automatically ended after a set elapsed time, after detecting a set level of discharge of the first battery subsystem 110, or after a set level of recharge of the second battery subsystem 120.

The end of the first operational phase is followed immediately by the institution of a second operational phase during which the function control 310 directs the switching system 200: to substitute the second battery subsystem 120 for the first battery subsystem 110, to substitute the third battery subsystem 130 for the second battery subsystem 120, and to substitute the first battery subsystem 110 for the third battery subsystem 130. In other words, during the second operational phase, the second battery subsystem 120 is used to power, the third battery subsystem 130 is recharged, and the first battery subsystem 110 is disconnected from the power and recharging circuits. During a third operational phase, the third battery subsystem 130 powers the system, the first battery subsystem 110 is recharged, and the second battery subsystem 120 is disconnected. The rotation through the first, second and third operational phases may be repeated to provide uninterrupted power to the load source.

As will be understood by those skilled in the art, the invention may be embodied in other specific forms without departing from the spirit or essential characteristics thereof. The elements described above are provided as illustrative examples of one technique for implementing the invention. One skilled in the art will recognize that many other implementations are possible without departing from the present invention as recited in the claims. For example, the types, sizes and capacities of the batteries, electric motor, electric generator, inductor and rectifier used may vary without departing from the intended scope of the invention. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. An electric power system comprising:
   first and second electric battery subsystems, each having a first pole with a first polarity and a second pole with a second polarity;
   a switching subsystem coupled to the first pole of the first electric battery subsystem and the first pole of the second electric battery subsystem;
   an electrically powered function control subsystem coupled to the switching subsystem and the second poles of the first and second electric battery subsystems, said electrically powered function control subsystem including a processor and memory;
   a capacitor subsystem coupled to the electrically powered function control subsystem;
   an electric motor coupled to the electrically powered function control subsystem;
   an electric generator subsystem operatively connected to the electric motor;
   an electric power distribution subsystem coupled to the electric generator subsystem, said electric power distribution subsystem including an outlet load line configured to be connected to an electric load;
   an inductor subsystem coupled to the electric power distribution subsystem; and
   a rectifier subsystem coupled to the inductor subsystem, the switching subsystem, and the second poles of the first and second electric battery subsystems.

2. The electric power system of claim 1, wherein the switching subsystem is configured to selectively connect the first pole of the first electric battery subsystem to the rectifier subsystem and at a first same time selectively connect the first pole of the second electric battery subsystem to the electrically powered function control subsystem during a first operational phase, and wherein the switching subsystem is configured to selectively connect the first pole of the first electric battery subsystem to the electrically powered function control subsystem and at a second same time selectively connect the first pole of the second electric battery subsystem to the rectifier subsystem during a second operational phase.

3. The electric power system of claim 2, wherein a rotational speed of the electric motor and a rotational speed of the electric generator subsystem are set to optimize power depletion of the first and second electric battery subsystems for a predetermined level of available power on the outlet load line and predetermined durations of the first and second operational phases.

4. The electric power system of claim 3, further comprising a gear box operatively connecting the electric motor and the electric generator subsystem, said gear box being configured to adjust a relative rotational speed of the electric generator subsystem to the electric motor.

5. The electric power system of claim 4, wherein the electrically powered function control subsystem provides automatic adjustment of the relative rotational speed of the electric generator subsystem to the electric motor via control of the gearbox.

6. The electric power system of claim 3, wherein the switching subsystem automatically switches between (i) connecting the first pole of the first electric battery subsystem to the rectifier subsystem and (ii) connecting the first pole of the first electric battery subsystem to the electrically powered function control subsystem based on a predetermined elapsed time.

7. The electric power system of claim 3, wherein the switching subsystem automatically switches between (i) connecting the first pole of the first electric battery subsystem to the rectifier subsystem and (ii) connecting the first pole of the first electric battery subsystem to the electrically powered function control subsystem based on a predetermined level of charge associated with the first electric battery subsystem.

8. The electric power system of claim 2, wherein the switching subsystem includes:
a first high voltage contactor coupled to the rectifier subsystem, the electrically powered function control subsystem, and the first pole of the first electric battery subsystem, and
a second high voltage contactor coupled to the rectifier subsystem, the electrically powered function control subsystem, and the first pole of the second electric battery subsystem.

9. The electric power system of claim 3, wherein the electrically powered function control subsystem automatically sets an upper limit on available power for the outlet load line based on electric power output of the electric generator and recharging requirements of the first and second electric battery subsystems.

10. An electric power system comprising:
first, second and third electric battery subsystems, each having a first pole with a first polarity and a second pole with a second polarity;
a switching subsystem coupled to the first pole of the first electric battery subsystem, the first pole of the second electric battery subsystem, and the first pole of the third electric battery subsystem;
an electrically powered function control subsystem coupled to the switching subsystem and the second poles of the first, second and third electric battery subsystems, said electrically powered function control subsystem including a processor and memory;
a capacitor subsystem coupled to the electrically powered function control subsystem;
an electric motor coupled to the electrically powered function control subsystem;
an electric generator subsystem operatively connected to the electric motor;
an electric power distribution subsystem coupled to the electric generator subsystem, said electric power distribution subsystem including an outlet load line configured to be connected to an electric load;
an inductor subsystem coupled to the electric power distribution subsystem; and
a rectifier subsystem coupled to the inductor subsystem, the switching subsystem, and the second poles of the first, second and third electric battery subsystems.

11. The electric power system of claim 10, wherein the switching subsystem is configured to selectively connect the first pole of the first electric battery subsystem to the electrically powered function control subsystem and at a first same time selectively connect the first pole of the second electric battery subsystem to the rectifier subsystem during a first operational phase, and
wherein the switching subsystem is configured to selectively connect the first pole of the second electric battery subsystem to the electrically powered function control subsystem and at a second same time selectively connect the first pole of the third electric battery subsystem to the rectifier subsystem during a second operational phase, and
wherein the switching subsystem is configured to selectively connect the first pole of the third electric battery subsystem to the electrically powered function control subsystem and at a third same time selectively connect the first pole of the first electric battery subsystem to the rectifier subsystem during a third operational phase.

12. The electric power system of claim 11, wherein a rotational speed of the electric motor and a rotational speed of the electric generator subsystem are set to optimize power depletion of the first, second and third electric battery subsystems for a predetermined level of available power on the outlet load line and predetermined durations of the first, second and third operational phases.

13. The electric power system of claim 12, further comprising a gear box operatively connecting the electric motor and the electric generator subsystem, said gear box being configured to adjust a relative rotational speed of the electric generator to the electric motor.

14. The electric power system of claim 13, wherein the electrically powered function control subsystem provides automatic adjustment of the relative rotational speed of the electric generator subsystem to the electric motor via control of the gearbox.

15. The electric power system of claim 12, wherein the switching subsystem automatically switches between (i) connecting the first pole of the first electric battery subsystem to the rectifier subsystem and (ii) connecting the first pole of the first electric battery subsystem to the electrically powered function control subsystem based on a predetermined elapsed time.

16. The electric power system of claim 12, wherein the switching subsystem automatically switches between (i) connecting the first pole of the first electric battery subsystem to the rectifier subsystem and (ii) connecting the first pole of the first electric battery subsystem to the electrically powered function control subsystem based on a predetermined level of charge associated with the first electric battery subsystem.

17. The electric power system of claim 12, wherein the electrically powered function control subsystem automatically sets an upper limit on available power for the outlet load line based on electric power output of the electric generator subsystem and recharging requirements of the first, second and third electric battery subsystems.

18. The electric power system of claim 12 wherein optimized power depletion of the first electric battery subsystem is achieved by minimizing total power depletion over a duration of the first operational phase.

19. A method of generating, storing and distributing electric power comprising:
  applying direct current electric power from a first electric battery subsystem to a function control subsystem, wherein said function control subsystem is coupled to a capacitor subsystem;
  applying the direct current electric power from the function control subsystem to a direct current motor;
  providing input rotational motion from the direct current motor to a gear box and generating output rotational motion from the gear box;
  generating alternate current electric power from the output rotational motion of the gear box;
  distributing a first portion of the generated alternate current electric power to an outlet load line configured to be connected to an electric load, and a second portion of the generated alternate current electric power to an inductor subsystem;
  applying alternate current electric power from the inductor subsystem to a rectifier subsystem and generating additional direct current electric power using the rectifier subsystem; and
  applying the additional direct current electric power from the rectifier subsystem to a second electric battery subsystem,
  wherein a relationship of the input rotational motion to the output rotational motion of the gear box is set to optimize power depletion of the first electric battery subsystem for a predetermined level of available power on the outlet load line and predetermined durations of the first, second and third operational phases.

20. The method of generating, storing and distributing electric power of claim 19 wherein optimized power depletion of the first electric battery subsystem is achieved by minimizing total power depletion over the duration of the first operational phase.

\* \* \* \* \*